US010539202B2

(12) United States Patent
Jee

(10) Patent No.: US 10,539,202 B2
(45) Date of Patent: Jan. 21, 2020

(54) VEHICULAR SHOCK ABSORBER AND METHOD FOR CONTROLLING SAME

(71) Applicant: MANDO CORPORATION, Pyeongtaek-si, Gyeonggi-do (KR)

(72) Inventor: Young Hwan Jee, Anseong-si (KR)

(73) Assignee: MANDO CORPORATION, Pyeongtaek-si, Gyeonggi-do (KR)

(*) Notice: Subject to any disclaimer, the term of this patent is extended or adjusted under 35 U.S.C. 154(b) by 0 days.

(21) Appl. No.: 15/921,062

(22) Filed: Mar. 14, 2018

(65) Prior Publication Data

US 2018/0266510 A1 Sep. 20, 2018

(30) Foreign Application Priority Data

Mar. 17, 2017 (KR) .......................... 10-2017-0033980

(51) Int. Cl.
F16F 9/32 (2006.01)
F16F 9/50 (2006.01)
(Continued)

(52) U.S. Cl.
CPC ............. F16F 9/325 (2013.01); F16F 9/185 (2013.01); F16F 9/3221 (2013.01);
(Continued)

(58) Field of Classification Search
CPC .. F16F 9/50; F16F 9/512; F16F 9/3221; F16F 9/325; B60G 17/048; B60G 17/08
(Continued)

(56) References Cited

U.S. PATENT DOCUMENTS 4,850,461 A * 7/1989 Rubel ..................... F16F 9/466
188/282.1
5,024,459 A * 6/1991 Kokubo ............... B60G 17/016
280/124.159
(Continued)

FOREIGN PATENT DOCUMENTS

DE 92 05 435.8 U1 6/1992
DE 102 60 395 B3 6/2004
(Continued)

OTHER PUBLICATIONS

Office Action issued in German Patent Application No. 102018105918.3 dated Jun. 21, 2019.

Primary Examiner — Thomas J Williams
(74) Attorney, Agent, or Firm — Morgan Lewis & Bockius LLP

(57) ABSTRACT

Embodiments disclosed herein provide a vehicular active shock absorber in which two variable valves is able to be operated by one solenoid, a tube connecting a damping force-variable valve and the pump is not subjected to a bending force and is not expanded, and a space of a compression chamber is small. According to the embodiments, there is provided a vehicular shock absorber including: a damper including a cylinder, a piston valve disposed inside the cylinder, and a piston rod, of which one end is connected to the piston valve and a remaining end is connected to a vehicle body; a damping force-variable valve assembly attached to an outer portion of the damper and configured to regulate a flow of the working fluid of the damper; a pump fixed to the vehicle body; and a tube configured to make the pump and a piston road flow path provided in the piston rod communicate with each other. The piston rod flow path makes the tube and an extension chamber of the damper communicate with each other.

16 Claims, 2 Drawing Sheets

(51) Int. Cl.
*F16F 9/18* (2006.01)
*F16F 9/34* (2006.01)
*F16F 9/346* (2006.01)

(52) U.S. Cl.
CPC ............ *F16F 9/3405* (2013.01); *F16F 9/346* (2013.01); *F16F 2230/0023* (2013.01); *F16F 2230/22* (2013.01)

(58) Field of Classification Search
USPC ........................................................ 267/218
See application file for complete search history.

(56) References Cited

U.S. PATENT DOCUMENTS

| | | | |
|---|---|---|---|
| 5,231,583 A | 7/1993 | Lizell | |
| 5,295,563 A * | 3/1994 | Bennett | B60G 17/0152 188/266.2 |
| 5,797,594 A * | 8/1998 | Sekine | B60G 15/07 188/315 |
| 5,934,421 A * | 8/1999 | Nakadate | F16F 9/325 188/299.1 |
| 6,321,887 B1 * | 11/2001 | Kurusu | B60G 17/018 188/266.2 |
| 8,776,961 B2 * | 7/2014 | Mori | B60G 17/08 188/266.2 |
| 9,855,814 B2 | 1/2018 | Tucker et al. | |
| 2012/0073920 A1 * | 3/2012 | Yamasaki | B60G 17/08 188/315 |
| 2017/0253101 A1 * | 9/2017 | Kuriki | B60G 17/08 |

FOREIGN PATENT DOCUMENTS

| | | |
|---|---|---|
| DE | 10 2009 022 328 A1 | 6/2010 |
| DE | 10 2016 206 595 A1 | 10/2017 |
| EP | 0 529 706 A1 | 3/1993 |
| JP | 09096335 A * | 4/1997 |
| KR | 10-2009-0087572 A | 8/2009 |
| KR | 10-2010-0004401 A | 1/2010 |
| KR | 10-2015-0125289 A | 11/2015 |

* cited by examiner

VEHICULAR SHOCK ABSORBER AND METHOD FOR CONTROLLING SAME

CROSS REFERENCE TO RELATED APPLICATION

This application claims priority from Korean Patent Application No. 10-2017-0033980, filed on Mar. 17, 2017, which is hereby incorporated by reference for all purposes as if fully set forth herein.

BACKGROUND OF THE INVENTION

1. Field of the Invention

Embodiments disclosed herein relate to a vehicular shock absorber, and more particularly, to an active shock absorber that is compact and has improved durability and improved responsiveness.

2. Description of the Prior Art

Generally, a vehicle is equipped with a damping apparatus in order to improve ride comfort by damping impact or vibration of an axle on a road surface when the vehicle is traveling on the road, and a shock absorber is used as such a damping apparatus. In addition, a damping force-variable shock absorber is able to improve ride comfort by lowering the damping force of a damper during normal traveling so as to absorb vibration caused by the unevenness of the road surface, and to improve steering stability by increasing the damping force of the damper so as to suppress the attitude change of the vehicle body during turning, acceleration, braking, high-speed travel, and so on.

In addition, the damping force-variable shock absorber may be provided with a damping force-variable valve assembly capable of appropriately adjusting the damping force characteristic of the damper on one side of the damper. In this case, the damping force generated in the damper by the damping force-variable valve assembly may be appropriately adjusted in accordance with the traveling state of the vehicle.

In addition, the active shock absorber may further include a pump controlled by, for example, an electronic control unit (ECU) in order to reduce vibration, shock, and the like transmitted from a road surface to a vehicle body through wheels, for example, during the traveling of the vehicle, and the pump is able to supply working fluid to an extension chamber (or a compression chamber) of the damper in accordance with a control signal from the ECU.

However, since such a conventional shock absorber requires a lot of space when mounted on a vehicle, interference with other components is increased, thereby degrading the ease of mounting.

In addition, the flow path of the damping force-variable valve and the pump are connected to each other by two flexible tubes, i.e. a flexible high-pressure tube and a flexible low-pressure tube. However, because the cylinder continuously moves vertically with respect to the vehicle body during the traveling of the vehicle while the pump is mounted to be fixed with respect to the vehicle body, the two flexible tubes are also repeatedly bent and stretched, thereby shortening the life span of the flexible tubes and eventually degrading the durability of the shock absorber.

Further, when the pressure of the working fluid rises, the flexible tubes may be inflated, thereby degrading the responsiveness of the damper.

Further, in the conventional shock absorber, because the components corresponding to body valves, that is, a check valve and a blow-off valve, are provided in the damping force-variable valve assembly, there is a problem in that compression response may be delayed when the internal space of the compression chamber is increased and air is present therein. Further, a large amount of foreign matter may be generated at the time of manufacturing, and thus the foreign matter may not be fully removed, thereby being mixed with the working fluid to prevent smooth flow of the working fluid.

SUMMARY OF THE INVENTION

Embodiments disclosed herein have been conceived in order to solve the problems in the related art as described above and provide a vehicular active shock absorber in which two variable valves can be activated by one solenoid, a tube connecting a damping force-variable valve and a pump is not subjected to bending force, the tube is not expanded, and a compression chamber has a small space.

According to embodiments disclosed herein, there is provided a vehicular shock absorber including: a damper including a cylinder, a piston valve disposed inside the cylinder, and a piston rod, of which one end is connected to the piston valve and a remaining end is connected to a vehicle body; a damping force-variable valve assembly attached to an outer portion of the damper and configured to regulate a flow of the working fluid of the damper; a pump fixed to the vehicle body; and a high-pressure tube configured to make the pump and a piston road flow path provided in the piston rod communicate with each other. The piston rod flow path makes the high-pressure tube and an extension chamber of the damper communicate with each other.

According to embodiments disclosed herein, there is provided a method for controlling a vehicular shock absorber including a damper including a cylinder provided with an outer tube and an inner tube, a piston valve dividing the inside of the inner tube into an extension chamber and a compression chamber, and a piston rod connected to the piston valve, and a damping force-variable valve assembly attached to an outer portion of the damper and configured to regulate a flow of the working fluid of the damper. The method including: causing the pump to supply a working fluid in a reservoir chamber disposed between the outer tube and the inner tube to the extension chamber; and controlling a flow rate flowed into the extension chamber and the compression chamber by controlling one of two variable valves provided in the damping force-variable valve assembly.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments of the present disclosure will be described with reference to the drawings, and the advantages and features of the embodiments and a method of achieving the same may be clearly understood through the description.

In addition, it will be apparent to a person ordinarily skilled in the art that the following description relates to embodiments of the present disclosure and is not intended to limit the present disclosure to the embodiments described below and the present disclosure may be implemented in various forms other than those described in the following description without departing from the technical idea of the present disclosure.

The embodiments described below are provided in order to completely disclose the present disclosure, and to clearly explain the scope of the present disclosure to a person ordinarily skill in the art to which the present disclosure belongs. However, the scope of the present disclosure is only defined by the claims.

Figure 1:
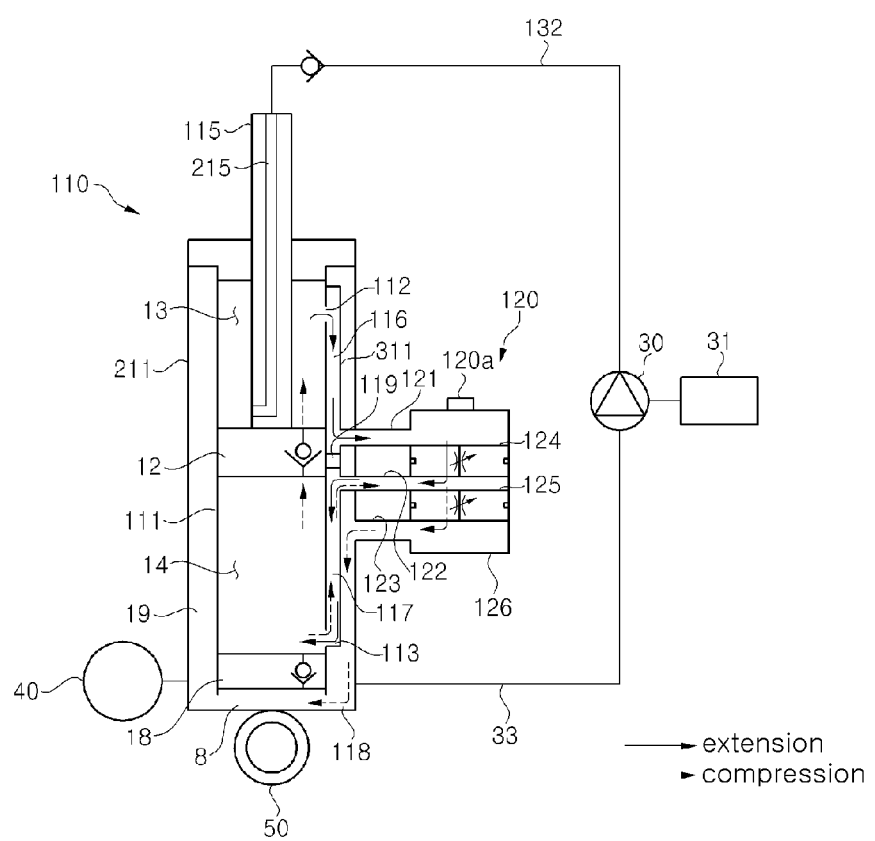
FIGS. 1 and 2 are views schematically illustrating a vehicular shock absorber according to embodiments.

Referring to FIG. 1, a schematic diagram of a vehicular shock absorber according to the present disclosure is shown.

A vehicular active shock absorber 200 according to the embodiments illustrated in FIG. 1 may include a damper 110 configured to generate a damping force, a damping force-variable valve assembly 120 configured to change the flow path of a working fluid so as to control the damping force generated in the damper 110, and a pump 30 configured to supply the working fluid to an extension chamber 13 at various pressures.

The damper 110 includes a cylinder, i.e. an outer tube 211 operatively connected to vehicle wheels (not illustrated) by, for example, a lower mount 50 and other components (not illustrated), an inner tube 111 disposed inside the outer tube 211 with a reservoir chamber 19 interposed therebetween, a piston valve 12 disposed inside the inner tube 111 so as to separate an inner space inside the inner tube 111 into the extension chamber 13 and a compression chamber 14 and including a check valve or the like, and a piston rod 115, of which one end is fixed to the piston valve 12 and the other end is connected to the vehicle body (not illustrated). An intermediate tube 311 is disposed between the outer tube 211 and the inner tube 111.

Although not illustrated in the drawings, the shock absorber 200 may further include a coil spring disposed adjacent to the damper 10 or arranged in the manner of being wound around the outer periphery of the damper 10 so as to cooperate with the damper 10. For example, the coil spring may be disposed between a lower mounting bracket fixed to the outside of the cylinder and an upper mounting bracket fixed to the piston rod 115.

As described above, because the damper 110 of the shock absorber 200 according to the embodiments is mounted between the vehicle body and the vehicle wheels, the cylinder is reciprocated in a substantially vertical direction with respect to the vehicle body due to the impact applied to the wheels from the road surface during the traveling of the vehicle, but the upper end of the piston rod is fixed to the vehicle body.

In the upper portion between the inner tube 111 and the intermediate tube 311, an extension-side flow path 116 communicating with the extension chamber 13 is formed by a hole 112 disposed in the upper portion of the inner tube 111. In addition, in the lower portion between the inner tube 111 and the intermediate tube 311, a compression-side flow path 117 communicating with the compression chamber 14 is formed by a hole 113 disposed in the lower portion of the inner tube 111. The intermediate tube 311 is attached to the outside of the inner tube 111 such that the extension-side flow path 116 and the compression-side flow path 117 are separated from the reservoir chamber 19. The extension-side flow path 116 and the compression-side flow path 117 are separated from each other by a partition 119.

The damping force-variable valve assembly 120, which is secured to the outside of the damper 110, e.g., the outer tube 211, includes a housing 126, two variable valves disposed within the housing 126 (i.e., an extension-variable valve 124 and a compression-variable valve 125, and three connection flow paths 121, 122, and 123, which connects the housing 126 and the damper 110 to each other. The variable valves 124 and 125 can be operated by one solenoid 120a.

The damping force-variable valve assembly 120 may be configured in various forms as disclosed in, for example, Korean Patent Laid-Open Nos. 10-2009-0087572, 10-2010-0004401, 10-2015-0125289, etc. For simplicity, a detailed description thereof will be omitted.

The first connection flow path 121 makes the flow path in the upstream portion of the extension-variable valve 124 and the extension-side flow path 116 communicate with each other. The second connection flow path 122 makes the flow path in the downstream portion of the extension-variable valve 124 and the compression-side flow path 117 communicate with each other. The third connection flow path 123 makes a flow path in the downstream portion of the compression-variable valve 125 and the reservoir chamber 19 communicate with each other.

The pump 30 may be fixedly mounted on the vehicle body (not illustrated) such as an engine room or the like. The flexible low-pressure tube 33, one end of which is connected to the input port of the pump 30 into which the working fluid is introduced, is connected, at the other end thereof, to the outer tube 211 of the cylinder so as to communicate with the reservoir chamber 19. The high-pressure tube 132 constituted by a flexible tube or a steel pipe, one end of which is connected to the output port of the pump 30 through which the working fluid is discharged, is connected, at the other end thereof, to the piston rod 115 so as to communicate with a piston rod flow path 215. For example, the other end of the high-pressure tube 132 may communicate with the piston rod flow path 215 at the upper end of the piston rod 115, that is, at a portion of the piston rod 115 fixed to the vehicle body, or may communicate with the piston rod flow path 215 at a portion of the piston rod 115, which is always exposed to the outside of the cylinder.

The piston rod flow path 215 may be disposed in the piston rod 115 so as to make the other end of the high-pressure tube 132 connected to the piston rod 115 and the extension chamber 13 communicate with each other. For example, the piston rod flow path 215 may be provided inside the piston rod 112 in the longitudinal direction of the piston rod 115 and may be provided with a portion extending in a direction intersecting with the longitudinal direction of the piston rod 115 so as to communicate with the extension chamber 13.

In addition, the reservoir chamber 19 may be connected to communicate with an accumulator 40 disposed separately from the cylinders 211, 111, and 311. The accumulator 40 may serve to suppress the aeration of the working fluid, for example, when the volume of the working fluid in the reservoir chamber 19 is reduced by the pump 30, as described later.

In addition, a body valve 18 configured with, for example, a check valve is disposed on the lower side of the cylinder, and a space portion 8, which is isolated from the compression chamber 14, is formed below the body valve 18. The space portion 8 may communicate with the reservoir chamber 19 through an orifice or the like.

The operation of the shock absorber 200 including the above-described configuration will be described below.

First, when the piston rod 115 is extended (see solid line arrows in FIG. 2), that is, when the piston valve 12 is moved upward, for example, due to the vibration of the vehicle body generated during the traveling of the vehicle, the working fluid inside the extension chamber 13 flows into the extension-side flow path 116 through the hole 112 and then flows into the extension-variable valve 124 of the damping force-variable valve assembly 120 through the first connection flow path 121. The extension-variable valve 124 may be controlled by an ECU (not illustrated) of the vehicle to regulate the flow rate of the working fluid.

The working fluid, which has passed through the extension-variable valve 124, flows into the compression-side flow path 117 through the second connection flow path 122 and then flows into the compression chamber 14 through the hole 113.

Next, when the piston rod 115 is compressed (see dotted line arrows in FIG. 2), that is, when the piston valve 12 is moved downward, the working fluid in the compression chamber 14 flows into the compression-side flow path 117 through the hole 113, and then flows to the compression-variable valve 125 through the second connection flow path 122. The compression-variable valve 125 may be controlled by the ECU (not illustrated) of the vehicle to regulate the flow rate of the working fluid. The working fluid, which has passed through the compression-variable valve 125, flows into the reservoir chamber 19 through the third connection flow path 123. At this time, the working fluid within the compression chamber 14 may also flow into the expansion chamber 13 through the check valve of the piston valve 12.

Meanwhile, the pump 30 may be driven by a motor 31 controlled by, for example, the ECU (not illustrated) of the vehicle, and may supply the working fluid of the reservoir chamber 19 to the extension chamber 13 through the flexible low-pressure tube 33, the high-pressure tube 132, the check valve, and the piston rod flow path 215. At this time, the pressure of the working fluid supplied to the extension chamber 13 by the pump 30 may be variously changed by the ECU. In the case in which the pump 30 supplies the working fluid to the extension chamber 13 as described above, when the extension-variable valve 124 is controlled to reduce the flow rate of the working fluid, the extension-side damping force may be changed in a hard manner (hereinafter, referred to as "extension hard control"), when the extension-variable valve 124 is fully closed, the piston valve 12 may be moved downward, or when the extension-variable valve 124 is fully opened so that no resistance is applied to the flow of the working fluid, the extension-side damping force may be changed in a soft manner (hereinafter, referred to as "extension soft control").

Further, the above-described extension hard control or extension soft control are able to make the extension-side damping force harder and softer, respectively, by increasing the pressure of the working fluid supplied to the extension chamber 13. In contrast, the above-described extension hard control or extension soft control are able to make the extension-side damping force less hard and less soft, respectively, by decreasing the pressure of the working fluid supplied to the extension chamber 13.

Meanwhile, when the pump 30 is not operated, the shock absorber 200 may also be operated in a semi-active manner. Further, if necessary, the motor 31 connected to the pump 30 may be used as a generator in order to produce electricity.

Figure 2:
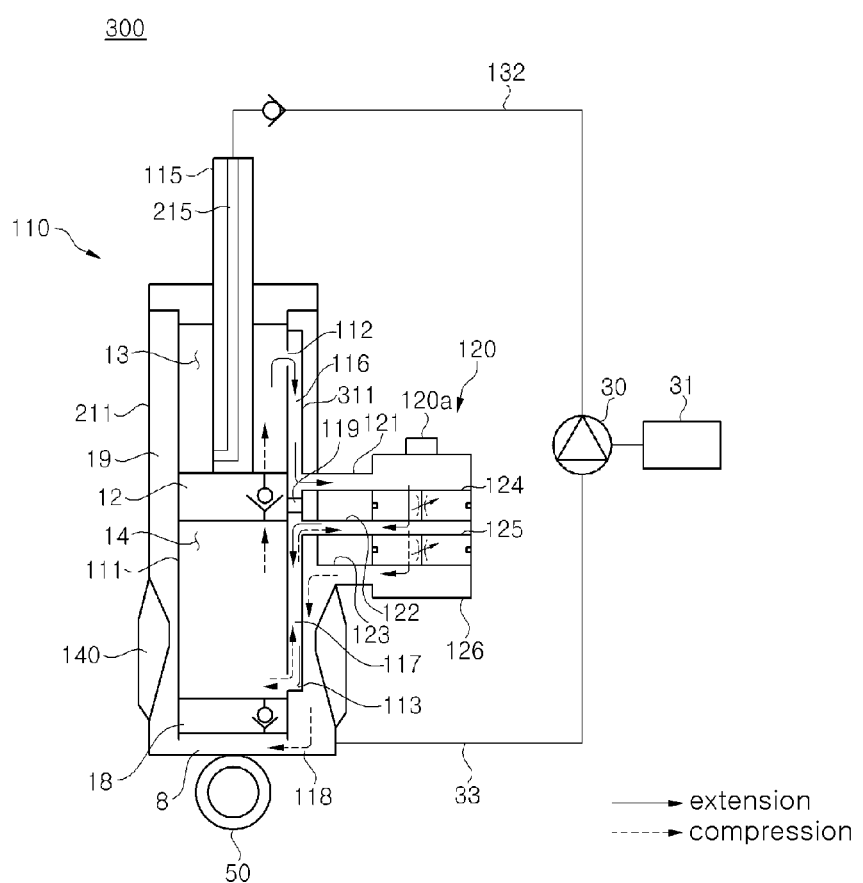

Referring to FIG. 2, a schematic diagram of a vehicular shock absorber 300 according to the embodiments is illustrated.

The difference between the shock absorber 300 illustrated in FIG. 2 and the shock absorber 200 illustrated in FIG. 1 is that the shock absorber 300 includes an accumulator 140 provided inside the outer tube 211. That is, because the accumulator 140 is provided inside the outer tube 211, no portion protrudes to the outside of the damper 110, so that the shock absorber 300 can be configured more compactly and thus can be mounted more easily.

According to the configuration of the embodiments described above, since two variable valves can be driven by one solenoid 120*a*, the shock absorber can be configured compactly and the output port of the pump 30 can be connected to the extension chamber 120. Since a flow path for making the output port of the pump 30 communicate with the extension chamber 13 is formed by the piston rod flow path 215 disposed inside the piston rod 115, i.e. since the high-pressure tube 132 can be connected to the piston rod 115, the high-pressure tube 132 is not bent and stretched. Therefore, the durability of the high-pressure tube 132 and the durability of the shock absorbers 200 and 300 can be improved.

In addition, since the high-pressure tube 132 does not receive a bending force in spite of the reciprocating movement of the cylinder, the high-pressure tube 132 may be configured with a steel pipe instead of the flexible tube. In this case, it is possible to prevent a phenomenon in which the response of the shock absorber is delayed due to the expansion of the flexible tube.

Furthermore, since the body valve 18 is disposed within the compression chamber 14, the internal space of the compression chamber 14 is reduced. Thus, it is possible to suppress a phenomenon in which the response of the shock absorber is delayed.

In addition, since the input port of the pump 30 capable of supplying the working fluid to the extension chamber 13 at various pressures communicates with the reservoir chamber 19 disposed between the outer tube 211 and the inner tube 111, the damping force control width of the damper 110 can be further increased.

While the present disclosure has been described with reference to exemplary embodiments, it is noted that the present disclosure is not limited to the disclosed embodiments and the embodiments described can be variously changed or modified by a person ordinarily skilled in the art within the technical idea and scope of the present disclosure.

What is claimed is:
1. A vehicular shock absorber comprising:
a damper comprising a cylinder, a piston valve disposed inside the cylinder, and a piston rod, of which one end is connected to the piston valve and a remaining end is connected to a vehicle body;
a damping force-variable valve assembly attached to an outer portion of the damper and configured to regulate a flow of a working fluid of the damper;
a pump fixed to the vehicle body; and
a high-pressure tube configured to make the pump and a piston rod flow path provided in the piston rod communicate with each other,
wherein the piston rod flow path makes the high pressure tube and an extension chamber of the damper communicate with each other,
wherein the cylinder comprises an outer tube, an inner tube disposed inside the outer tube, an intermediate tube attached to the inner tube, and a reservoir chamber disposed between the outer tube and the inner tube, and wherein the intermediate tube is disposed directly between the inner tube and the reservoir chamber.

2. The vehicular shock absorber of claim 1, wherein the high-pressure tube is formed of a steel pipe.

3. The vehicular shock absorber of claim 1, wherein the piston rod flow path is disposed in a longitudinal direction of the piston rod and is provided with at least one portion extending in a direction intersecting with the longitudinal direction of the piston rod and communicating with the extension chamber.

4. The vehicular shock absorber of claim 1, wherein the damping force-variable valve assembly comprises two variable valves operated by one solenoid.

5. The vehicular shock absorber of claim 1, wherein at least a portion of the reservoir chamber is disposed below a compression chamber of the damper in a longitudinal direction of the piston rod.

6. The vehicular shock absorber of claim 1, wherein an input port of the pump communicates with the reservoir chamber.

7. The vehicular shock absorber of claim 1, further comprising:
an accumulator disposed inside the outer tube.

8. The vehicular shock absorber of claim 7, wherein the accumulator is connected to communicate with the reservoir chamber.

9. The vehicular shock absorber of claim 1, further comprising:
a body valve disposed below a compression chamber of the damper.

10. The vehicular shock absorber of claim 4, wherein the cylinder comprises an outer tube, an inner tube disposed inside the outer tube, and an intermediate tube attached to the inner tube,
wherein a reservoir chamber is disposed between the outer tube and the inner tube and an extension-side flow path configured to communicate with the extension chamber and a compression-side flow path configured to communicate with the compression chamber are disposed between the inner tube and the intermediate tube,
wherein the damping force-variable valve assembly is connected to the damper so as to make the extension-side flow path and the compression-side flow path communicate each other and to make the compression-side flow path and the reservoir chamber communicate each other, and
wherein one of the two variable valves is disposed in a portion where the extension-side flow path and the compression-side flow path are connected to each other, and a remaining one of the two variable valves is disposed in a portion where the compression-side flow path and the reservoir camber are connected to each other.

11. The vehicular shock absorber of claim 10, wherein the two variable valves comprise an expansions variable valve configured to vary a flow rate to be flowed into the extension chamber and the compression chamber, and a compression-variable valve configured to vary a flow rate to be flowed into the compression chamber and the reservoir chamber.

12. The vehicular shock absorber of claim 11, wherein the damping force-variable valve assembly comprises a first connection flow path configured to make a flow path in an upstream portion of the extension-variable valve and the extension-side flow path communicate with each other; a second connection flow path configured to make a flow path in a downstream portion of the extension-variable valve and the compression-side flow path communicate with each other, and a third connection flow path configured to make a flow path in a downstream portion of the compression-variable valve and the reservoir chamber communicate with each other.

13. The vehicular shock absorber of claim 10, wherein an input port of the pump communicates with the reservoir chamber.

14. A method for controlling a vehicular shock absorber comprising a damper comprising a cylinder provided with an outer tube and an inner tube, a piston valve dividing an inside of the inner tube into an extension chamber and a compression chamber, and a piston rod connected to the piston valve, and a damping force-variable valve assembly attached to an outer portion of the damper and configured to regulate a flow of a working fluid of the damper, the method comprising:
causing a pump to supply the working fluid in a reservoir chamber disposed between the outer tube and the inner tube to the extension chamber; and
controlling a flow rate flowed into the extension chamber and the compression chamber by controlling one of two variable valves provided in the damping force-variable valve assembly,
wherein the cylinder comprises an outer tube, an inner tube disposed inside the outer tube, an intermediate tube attached to the inner tube, and a reservoir chamber disposed between the outer tube and the inner tube, and
wherein the intermediate tube is disposed directly between the inner tube and the reservoir chamber.

15. The method of claim 14, further comprising:
changing pressure of the working fluid supplied to the extension chamber by the pump.

16. The method of claim 14, further comprising:
using a motor as a generator to produce electricity when the pump does not operate.

* * * * *